(12) United States Patent
Wan

(10) Patent No.: US 10,687,033 B2
(45) Date of Patent: Jun. 16, 2020

(54) COLOR IMAGING SYSTEM

(71) Applicant: Google LLC, Mountain View, CA (US)

(72) Inventor: Chung Chun Wan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/139,898

(22) Filed: Sep. 24, 2018

(65) Prior Publication Data

US 2020/0099898 A1    Mar. 26, 2020

(51) Int. Cl.
*H04N 5/341*    (2011.01)
*H04N 9/04*     (2006.01)
*H04N 5/349*    (2011.01)

(52) U.S. Cl.
CPC .......... *H04N 9/045* (2013.01); *H04N 5/349* (2013.01); *H04N 5/3415* (2013.01)

(58) Field of Classification Search
None
See application file for complete search history.

(56) References Cited

U.S. PATENT DOCUMENTS

| 7,773,143 | B2 | 8/2010 | Feldman et al. |
| 2010/0103294 | A1 | 4/2010 | Min et al. |
| 2015/0288935 | A1 | 10/2015 | Shinozaki |
| 2016/0029000 | A1 | 1/2016 | Lenz |
| 2017/0118453 | A1 | 4/2017 | Kim et al. |

FOREIGN PATENT DOCUMENTS

| CN | 106210677 B | 2/2018 |
| EP | 2753082 | 7/2014 |

OTHER PUBLICATIONS

PCT International Search Report and Written Opinion issued in International Application No. PCT/US2019/042130, dated Oct. 15, 2019, 15 pages.

*Primary Examiner* — Mark T Monk
(74) *Attorney, Agent, or Firm* — Fish & Richardson P.C.

(57) ABSTRACT

Methods, systems, and apparatus, including computer programs encoded on a computer storage medium, for color imaging. In one aspect, a method includes obtaining, by an image sensor that includes pixels for detecting a first color and pixels for detecting a second color, a first image of a scene while the image sensor is in a first position, moving the image sensor to a second position, wherein, in the second position, a particular pixel for detecting the first color is located where a particular pixel for detecting the second color was previously located when the image sensor was in the first position, obtaining, by the image sensor, a second image of the scene while the image sensor is in the second position, generating a composite image based on the first image and the second image, and providing the composite image for output.

15 Claims, 4 Drawing Sheets

COLOR IMAGING SYSTEM

BACKGROUND

Electronic devices may include image sensors to capture images. The image sensors may include pixels for detecting different colors.

SUMMARY

This document describes techniques, methods, systems, and other mechanisms for color imaging. Image sensors may use a Bayer color filter array (CFA). In such an image sensor, a quarter of the pixels may have red filters on top of them, another quarter of the pixels may have blue filters on top of them, and the remaining half of the pixels may have green filters on top of them. As a result, red, blue, and green signals of a scene may be under-sampled by the image sensor, e.g., pixels with red filters on top may not detect blue. Interpolation, also referred to as de-mosaicing, may be required to reproduce color. For example, a particular portion of scene may only be sampled with a pixel with a green filter on top and an amount of blue for that particular portion of the scene may need to be interpolated based on the amount of blue sampled by pixels with blue filters on top near the pixel with the green filter on top. This interpolation may introduce color artifacts which may reduce image quality.

Additionally, ever decreasing device form factor has been driving the use of smaller image sensor with smaller pixels, particularly in the mobile world. The result is a reduction in camera sensitivity and dynamic range. To improve camera sensitivity and dynamic range, non-Bayer coding such as Quad Bayer coding may be used. An image sensor with Quad Bayer may have four pixels in a group. For example, four green pixels next to each other may work as a group. Similarly, four red pixels next to each other may work as a group, and finally, four blue pixels next to each other may work as a group. In situations when sensitivity is needed, e.g., low-light, signals captured by these four pixels can be combined so that they behave as if they were a single big pixel. In situations when high dynamic range is needed, e.g., looking outside through a window in a dark room, these four pixels can be configured to have different exposure times such that multiple images captured with these different exposure times can be combined later on to generate a high-dynamic-range image.

Despite the above advantages, Quad Bayer coding may have a serious drawback in a severe reduction in resolution. For example, in an image sensor with 48 MP native resolution, with Quad Bayer coding the effective resolution may become only 12 MP. The effective resolution may be reduced because pixels in the Quad Bayer coded sensor may be specific to particular colors. For example, only a quarter of the pixels in a Quad Bayer coded sensor may sense red so the effective resolution may be quartered from the native resolution.

These potential problems associated with use of Quad Bayer coded sensor may be solved by physically moving the sensor to various positions, obtaining an image for each of the positions, and then generating a composite image from the images for each position. The resulting composite image may have a higher resolution than any single image from a position and solve the drawback of reduction in resolution using a Quad Bayer coded sensor. Similarly, movement of a sensor to generate a composite image may be used to resolve a drawback of reduction in resolution of other sensors that include pixels for detecting different colors arranged in other patterns. Accordingly, the system may provide sensitivity, high dynamic range, and high resolution.

One innovative aspect of the subject matter described in this specification is embodied in a method that includes the actions of obtaining, by an image sensor that includes pixels for detecting a first color and pixels for detecting a second color, a first image of a scene while the image sensor is in a first position, where the first color and second color are different colors, moving the image sensor to a second position, wherein, in the second position, a particular pixel for detecting the first color is located where a particular pixel for detecting the second color was previously located when the image sensor was in the first position, obtaining, by the image sensor, a second image of the scene while the image sensor is in the second position, generating a composite image based on the first image and the second image, and providing the composite image for output.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects moving the image sensor to a second position includes moving the image sensor to the second position such that the particular pixel for detecting the first color is located where a particular pixel for detecting the second color was previously located when the image sensor was in the first position, relative to a camera that includes the image sensor. In some implementations, moving the image sensor to a second position includes moving the image sensor to the second position such that light from the scene that fell onto the particular pixel for detecting the second color in the first position instead falls onto the particular pixel for detecting the first color in the second position. In some aspects moving the image sensor to a second position includes moving the image sensor to the second position such that light from the scene that fell onto the particular pixel for detecting the first color in the first position instead falls onto a second particular pixel for detecting the second color in the second position. In certain aspects, generating a composite image based on the first image and the second image includes generating the composite image to include a first pixel from the particular pixel for detecting the first color while the image sensor was in the first position and a second pixel, at a different location in the composite image than the first pixel, from the particular pixel for detecting the first color while the image sensor was in the second position.

In some implementations, the image sensor includes a pattern of pixels for detecting colors, where the pattern includes a four by four grid of pixels that includes two two by two rectangle of pixels for detecting the first color, a two by two rectangle of pixels for detecting the second color, and a two by two rectangle of pixels for detecting a third color. In certain aspects, obtaining, by the image sensor, a third image of the scene while the image sensor is in a third position, wherein, in the third position, the particular pixel for detecting the first color is located where a second particular pixel for detecting the first color was previously located when the image sensor was in the first position and obtaining, by the image sensor, a fourth image of the scene while the image sensor is in a fourth position, wherein, in the fourth position, the particular pixel for detecting the first color is located where a particular pixel for detecting a third color was previously located when the image sensor was in the first position, where generating a composite image based on the first image and the second image includes generating the composite image based on the first image, the second image, the third image, and the fourth image.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
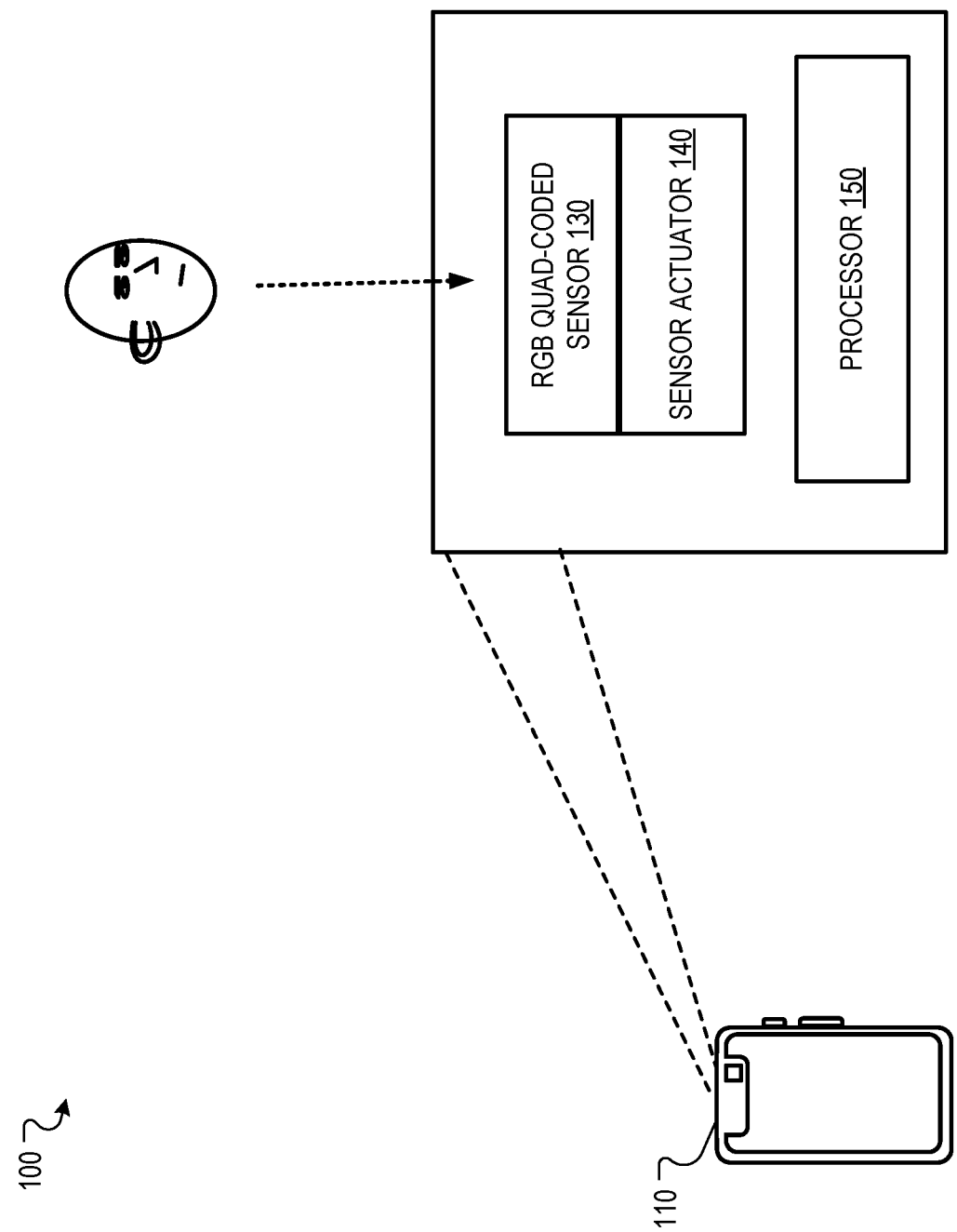
FIG. 1 is a conceptual diagram of a color imaging system.

FIG. 1 is a conceptual diagram of a color imaging system 100. The system 100 includes a mobile computing device 110 that includes a RGB Quad Coded sensor 130, a sensor actuator 140, and a processor 150. The mobile computing device 110 may be a smartphone, a tablet, or some other computing device.

The RGB Quad Coded sensor 130 may include pixels for detecting colors, also referred to as color pixels. The color pixels may be sensitive to red, green, or blue light. For example, the RGB Quad Coded sensor 130 may include a first pixel for detecting red that has a red filter on top while filters light before the light is detected by the first pixel, a second pixel for detecting blue that has a blue filter on top which filters light before the light is detected by the second pixel, and a third pixel for detecting green that has a green filter on top which filters light before the light is detected by the third pixel.

In some implementations, pixels for detecting a particular color may still be sensitive to another color, but more sensitive to the particular color. For example, a pixel for detecting red light may still detect blue light as some blue light may still pass through a red filter, but be much less sensitive to blue light than red light. The RGB Quad Coded sensor 130 may include pixels for detecting colors arranged in particular patterns, as further described in relation to FIG. 2.

The sensor actuator 140 may be an actuator that is coupled to the RGB Quad Coded sensor 130 such that the sensor actuator 140 may physically move the RGB Quad Coded sensor 130. For example, the sensor actuator 140 may be a micro-electrical-mechanical system (MEMS) that is able to move the RGB Quad Coded sensor 130. The sensor actuator 140 may be configured to be capable of moving the RGB Quad Coded sensor 130 a distance of the physical size of two pixel of the RGB Quad Coded sensor or a smaller distance at a time.

The processor 150 may control the RGB Quad Coded sensor 130 and the sensor actuator 140. For example, the processor 150 may control the sensor actuator 140 to move the RGB Quad Coded sensor 130 to different positions such that light from a scene that falls onto a pixel for detecting a first color in the RGB Quad Coded sensor 130 then falls onto a pixel for detecting a second pixel in the RGB Quad Coded sensor 130.

The processor 150 additionally obtains images from the RGB Quad Coded sensor 130 for the different positions and generates a composite image from the images. For example, the processor 150 may obtain four RGB images, from the RGB Quad Coded sensor 130, that each correspond to one of four different positions of the RGB Quad Coded sensor 130 and then generate a single composite image from the four RGB images, where the single composite image has a higher resolution than any of the four RGB images.

The speed that the processor 150 moves the RGB Quad Coded sensor 130 may be dependent on the frames per second of composite images that the system 100 is to provide. For example, if the system 100 is to provide thirty frames per second and the RGB Quad Coded sensor 130 is moved to four different positions per composite image, the processor 150 may instruct the sensor actuator 140 move one hundred twenty times per second. The speed of movement of the RGB Quad Coded sensor 130 may be sufficiently fast that a position and appearance of objects within the scene will not substantively change between the positions used to generate a single composite image.

Figure 2:
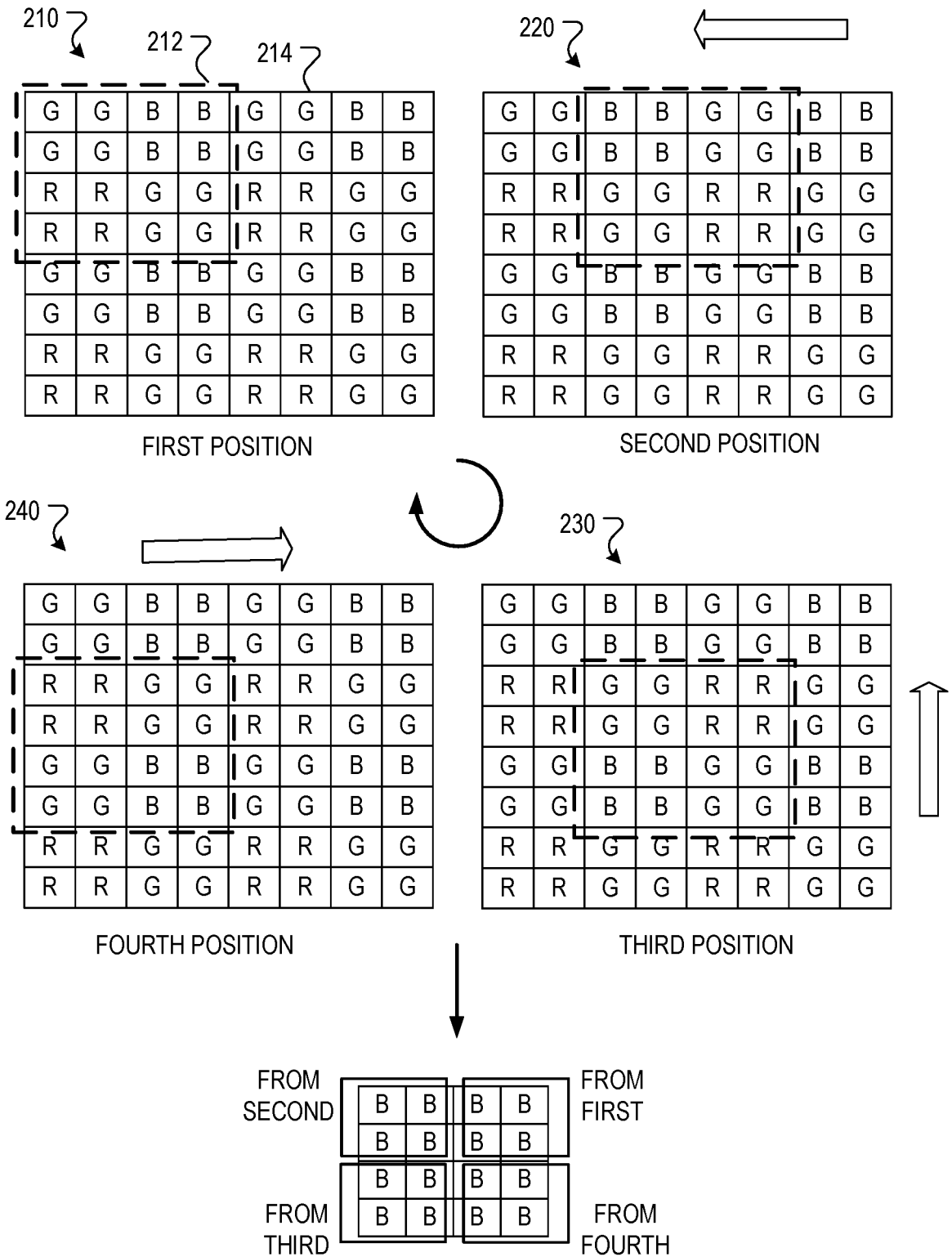
FIG. 2 is a conceptual diagram of movement of an example sensor in a color imaging system.

FIG. 2 is a conceptual diagram of movement of an example sensor 214 in a color imaging system. The sensor 214 includes a two by two group of a repeating four by four group of pixels, where each of the four by four group of pixels includes a two by two group of pixels for detecting green in an upper left, a two by two group of pixels for detecting blue in the upper right, a two by two group of pixels for detecting red in the lower left, and a two by two group of pixels for detecting green in the lower right.

The sensor 214 is shown in a first position 210, a second position 220, a third position 230, and a fourth position 240. In the first position 210, light from parts of the scene falls onto two by two groups of pixels for detecting blue. Additionally, in the first position 210, light from different parts of the scene falls onto two by two groups of pixels for detecting red and two by two groups of pixels for detecting green.

As can be seen in FIG. 2, with the first position 210 alone, the sensor 214 may only provide an image where blue is detected with an effective resolution of one fourth of the native resolution of the sensor as only one fourth of the pixels in the sensor may be for detecting blue.

In the second position 220, the sensor 214 has been moved a distance of two pixels to the left from the first position 210 such that the light from the portion of the scene that fell onto a two by two group of pixels for detecting green in the first position 210 now falls onto the two by two group of pixels for detecting blue. In the third position 230, the sensor 214 has been moved a distance of two pixels up from the second position 220 such that the light from the portion of the scene that fell onto the two by two group of pixels for detecting red in the first position 210 now falls onto the two by two group of pixels for detecting blue. In the fourth position 240, the sensor 214 has been moved a distance of two pixels right from the third position 230 such that the light from the portion of the scene that fell onto another two by two group of pixels for detecting green in the first position 210 now falls onto the two by two group of pixels for detecting blue. From the fourth position 240, the sensor 214 may then move two pixels down to return to the first position 210.

The resulting images from each of the positions may be combined to generate a composite image with a higher effective resolution than each of the images from each of the positions. As shown in FIG. 2, in the example of a portion of a scene that is detected by the four by four group of pixels in the first position 210 shown in a dotted rectangle, blue values for pixels in a composite image representing the portion of the scene may be obtained by taking pixel values in an image from the first position 210 from pixels for detecting blue and using that as the blue value of the upper right two by two pixels, taking pixel values in an image from the second position 220 from pixels for detecting blue and using that as the blue value of the upper left two by two pixels, taking pixel values in an image from the third position 230 from pixels for detecting blue and using that as the blue value of the lower left two by two pixels, and taking pixel values in an image from the fourth position 240 from pixels for detecting blue and using that as the blue value of the lower right two by two pixels. A similar corresponding process may be performed for red values and green values, and for the rest of the pixels in the composite image.

The order of the positions shown in FIG. 2 is only a single example. For example, the order of the positions may be re-arranged so that the second position and fourth positions are reversed by having the sensor 214 move two pixels up, then two pixels to the left, and then two pixels down. Other positions may be used for other arrangements color pixels. For example, the system 100 may instead use a sensor with four by four groups of pixels for detecting a single color instead of two by two groups of pixels for detecting a single color, where the sensor may then be moved four pixels at a time between four positions.

In some implementations, the system 100 may move the RGB Quad Coded sensor between the positions in a pattern that reduces a total distance that the RGB Quad Coded sensor is moved. For example, for two by two groups of pixels for detecting a single color, the sensor 214 may be moved in a square pattern.

Figure 3:
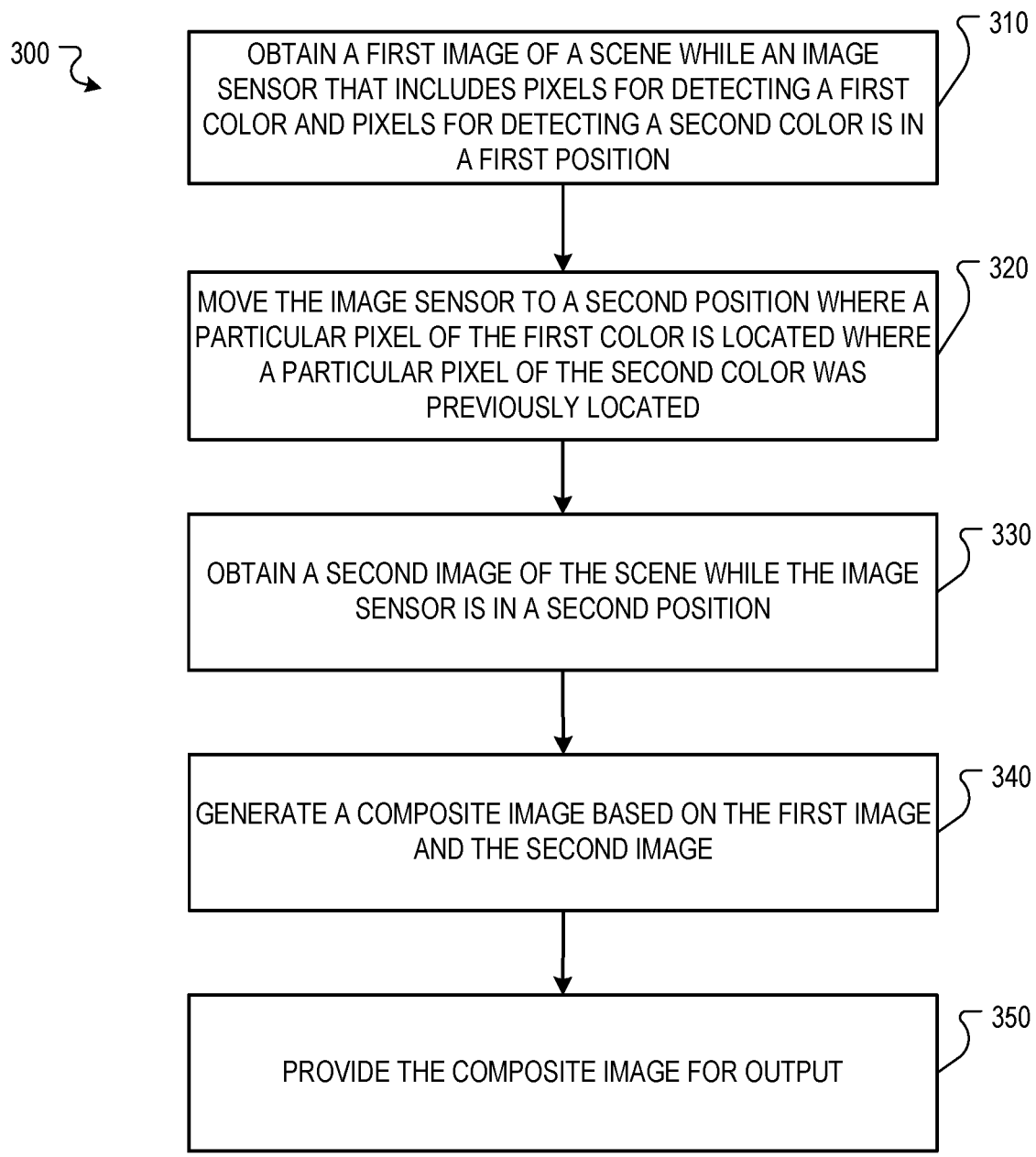
FIG. 3 is a flow diagram that illustrates an example of a process for color imaging.

FIG. 3 is a flow diagram that illustrates an example of a process 300 for color imaging. The operations of the process 300 may be performed by system 100 or other systems.

The process 300 includes obtaining a first image of a scene while an image sensor that includes pixels for detecting a first color and pixels for detecting a second color (310). For example, the processor 150 may obtain a first image of a person's face while the RGB Quad Coded sensor 130 is in the first position 210. In some implementations, the image sensor includes a pattern of pixels for detecting colors, where the pattern includes a four by four grid of pixels that includes two two by two rectangle of pixels for detecting the first color, a two by two rectangle of pixels for detecting the second color, and a two by two rectangle of pixels for detecting a third color. For example, the image sensor may be the sensor 214 shown in FIG. 2.

The process 300 includes moving the image sensor to a second position where a particular pixel for detecting the first color is located where a particular pixel for detecting the second color was previously located (320). For example, the processor 150 may control the sensor actuator 140 to move the RGB Quad Coded sensor 130 two pixels to the left into the second position 220 such that a lower right two by two group of pixels for detecting green are located where a two by two group of pixels for detecting red were located in the first position 210.

In some implementations, moving the image sensor to a second position includes moving the image sensor to the second position such that the particular pixel for detecting the first color is located where a particular pixel for detecting the second color was previously located when the image sensor was in the first position, relative to a camera that includes the image sensor. For example, the sensor actuator 140 may move the RGB Quad Coded sensor 130 a distance of two pixels while an exterior of the camera that includes the RGB Quad Coded sensor 130 remains stationary relative to the scene.

In some implementations, moving the image sensor to a second position includes moving the image sensor to the second position such that light from the scene that fell onto the particular pixel for detecting the second color in the first position instead falls onto the particular pixel for detecting the first color in the second position. For example, the sensor actuator 140 may move the RGB Quad Coded sensor 130 a distance of two pixels to the left such that light from the scene that fell on two by two group of pixels for detecting red in the first position 210 instead falls on the two by two group of pixels for detecting green in the second position 220.

In some implementations, moving the image sensor to a second position includes moving the image sensor to the second position such that light from the scene that fell onto the particular pixel for detecting the first color in the first position instead falls onto a second particular pixel for detecting the second color in the second position. For example, the sensor actuator 140 may move the RGB Quad Coded sensor 130 a distance of two pixels to the left such that light from the scene that fell on a lower right two by two group of pixels for detecting green in the first position 210 instead falls onto a two by two group of a pixel for detecting red in the second position 220.

The process 300 includes obtaining a second image of the scene while the image sensor is in the second position (330). For example, the processor 150 may obtain a second image of the person's face while the RGB Quad Coded sensor 130 is in the second position 220.

The process 300 includes generating a composite image based on the first image and the second image (340). For example, the processor 150 may generate a composite image from the first image from while the RGB Quad Coded sensor 130 is in the first position 210 and the second image from while the RGB Quad Coded sensor 130 is in the second position 220.

In some implementations, generating a composite image based on the first image and the second image includes generating the composite image to include a first pixel from the particular pixel for detecting the first color while the image sensor was in the first position and a second pixel, at a different location in the composite image than the first pixel, from the particular pixel for detecting the first color while the image sensor was in the second position. For example, the processor 150 may generate a composite image by having a first pixel with a green value from the first image and a second pixel with a green value from the second image.

The process 300 includes providing the composite image for output (350). For example, the processor 150 may provide the composite image as a bitmap where each pixel represents RGB values.

In some implementations, the process 300 includes obtaining, by the image sensor, a third image of the scene while the image sensor is in a third position, wherein, in the third position, the particular pixel for detecting the first color is located where a second particular pixel for detecting the first color was previously located when the image sensor was in the first position and obtaining, by the image sensor, a fourth image of the scene while the image sensor is in a fourth position, where, in the fourth position, the particular pixel for detecting the first color is located where a particular pixel for detecting a third color was previously located when the image sensor was in the first position, where generating the based on the first image and the second image includes generating the composite image based on the first image, the second image, the third image, and the fourth image.

For example, the processor 150 may obtain a third image while the sensor 214 is in the third position 230 where the lower right two by two pixels for detecting green are where the upper left two by two pixels for detecting green were in the first position 210 and a fourth image while the sensor 214 is in the fourth position 240 where the lower right two by two pixels for detecting green are where the two by two pixels for detecting blue were in the first position 210, and generate a composite image where for a four by four group of pixels in the composite image, the blue values in the upper right two by two group of pixels are set to the blue values in the first image, from the pixels for detecting blue, from the first position 210, the blue values in the upper left two by two group of pixels are set to the blue values in the second image, from the pixels for detecting blue, from the second position 220, the blue values in the lower left two by two group of pixels are set to the blue values in the third image, from the pixels for detecting blue, from the third position 230, and the blue values in the lower right two by two group of pixels are set to the blue values in the fourth image, from the pixels for detecting blue, from the fourth position 240. The processor 150 may, in parallel or sequentially, similarly perform the same for the other four by four group of pixels in the composite image for the blue values and perform the same for the green values and red values.

Figure 4:
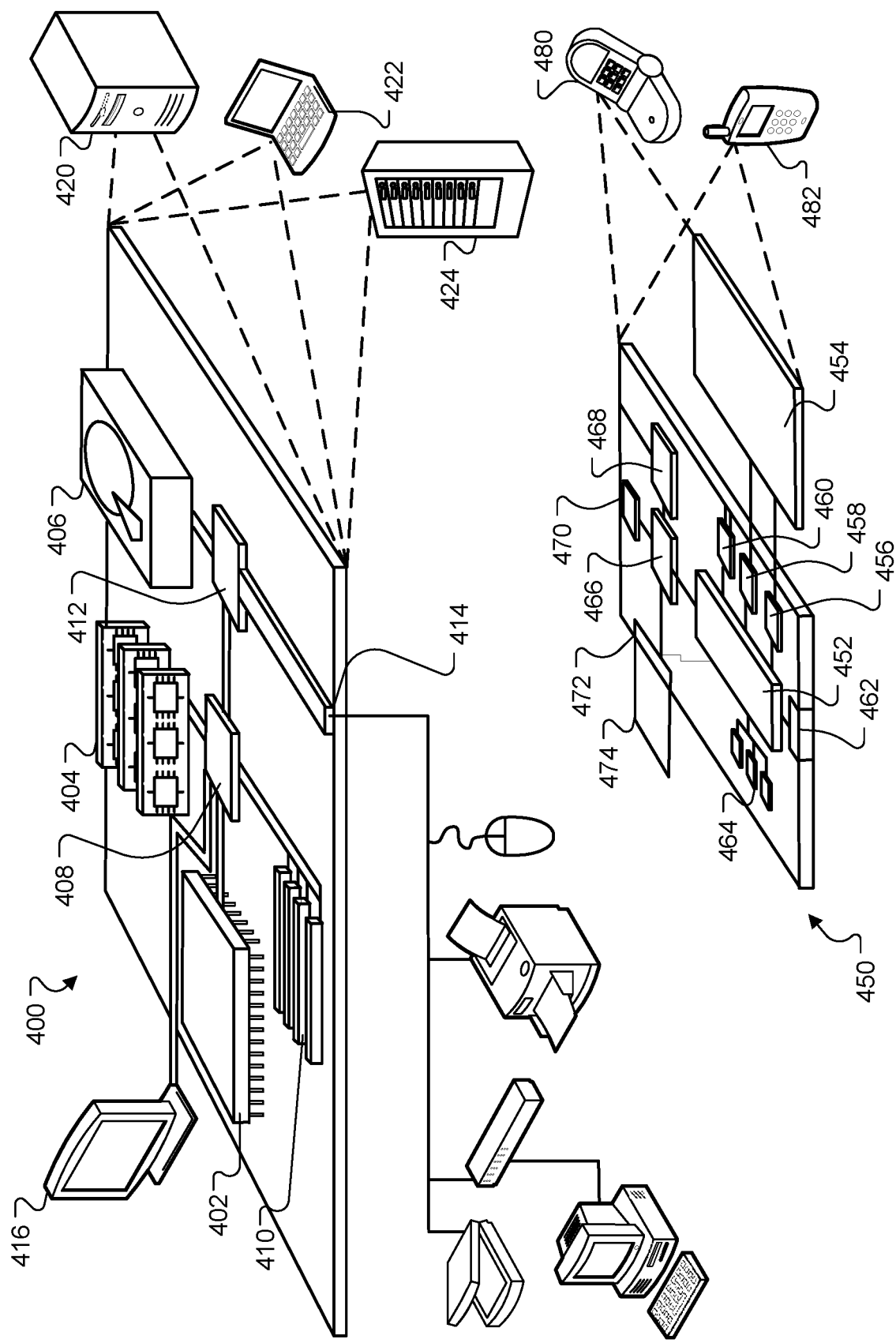
FIG. 4 is a block diagram of examples of computing devices that may be used to implement the systems and methods described in this document.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
obtaining, by an image sensor that includes a pattern of pixels for detecting a first color and pixels for detecting a second color, a first image of a scene while the image sensor is in a first position, where the first color and second color are different colors,
where the pattern includes a four by four grid of pixels that includes two different two by two rectangle of pixels for detecting the first color, a two by two rectangle of pixels for detecting the second color, and a two by two rectangle of pixels for detecting a third color;
moving the image sensor to a second position, wherein, in the second position, a particular pixel for detecting the first color is located where a particular pixel for detecting the second color was previously located when the image sensor was in the first position;
obtaining, by the image sensor, a second image of the scene while the image sensor is in the second position;
obtaining, by the image sensor, a third image of the scene while the image sensor is in a third position, wherein, in the third position, the particular pixel for detecting the first color is located where a second particular pixel for detecting the first color was previously located when the image sensor was in the first position;
obtaining, by the image sensor, a fourth image of the scene while the image sensor is in a fourth position, wherein, in the fourth position, the particular pixel for detecting the first color is located where a particular pixel for detecting a third color was previously located when the image sensor was in the first position;
generating a composite image based on the first image, the second image, the third image, and the fourth image; and
providing the composite image for output.

2. The method of claim 1, wherein moving the image sensor to a second position comprises:
moving the image sensor to the second position such that the particular pixel for detecting the first color is located where a particular pixel for detecting the second color was previously located when the image sensor was in the first position, relative to a camera that includes the image sensor.

3. The method of claim 1, wherein moving the image sensor to a second position comprises:
moving the image sensor to the second position such that light from the scene that fell onto the particular pixel for detecting the second color in the first position instead falls onto the particular pixel for detecting the first color in the second position.

4. The method of claim 1, wherein moving the image sensor to a second position comprises:
moving the image sensor to the second position such that light from the scene that fell onto the particular pixel for detecting the first color in the first position instead falls onto a second particular pixel for detecting the second color in the second position.

5. The method of claim 1, wherein generating a composite image based on the first image, the second image, the third image, and the fourth image comprises:
generating the composite image to include a first pixel from the particular pixel for detecting the first color while the image sensor was in the first position and a second pixel, at a different location in the composite image than the first pixel, from the particular pixel for detecting the first color while the image sensor was in the second position.

6. A system comprising:
one or more computers and one or more storage devices storing instructions that are operable, when executed by the one or more computers, to cause the one or more computers to perform operations comprising:
obtaining, by an image sensor that includes a pattern of pixels for detecting a first color and pixels for detecting a second color, a first image of a scene while the image sensor is in a first position, where the first color and second color are different colors, where the pattern includes a four by four grid of pixels that includes two different two by two rectangle of pixels for detecting the first color, a two by two rectangle of pixels for detecting the second color, and a two by two rectangle of pixels for detecting a third color;

moving the image sensor to a second position, wherein, in the second position, a particular pixel for detecting the first color is located where a particular pixel for detecting the second color was previously located when the image sensor was in the first position;

obtaining, by the image sensor, a second image of the scene while the image sensor is in the second position;

obtaining, by the image sensor, a third image of the scene while the image sensor is in a third position, wherein, in the third position, the particular pixel for detecting the first color is located where a second particular pixel for detecting the first color was previously located when the image sensor was in the first position;

obtaining, by the image sensor, a fourth image of the scene while the image sensor is in a fourth position, wherein, in the fourth position, the particular pixel for detecting the first color is located where a particular pixel for detecting a third color was previously located when the image sensor was in the first position;

generating a composite image based on the first image, the second image, the third image, and the fourth image; and providing the composite image for output.

7. The system of claim 6, wherein moving the image sensor to a second position comprises:

moving the image sensor to the second position such that the particular pixel for detecting the first color is located where a particular pixel for detecting the second color was previously located when the image sensor was in the first position, relative to a camera that includes the image sensor.

8. The system of claim 6, wherein moving the image sensor to a second position comprises:

moving the image sensor to the second position such that light from the scene that fell onto the particular pixel for detecting the second color in the first position instead falls onto the particular pixel for detecting the first color in the second position.

9. The system of claim 6, wherein moving the image sensor to a second position comprises:

moving the image sensor to the second position such that light from the scene that fell onto the particular pixel for detecting the first color in the first position instead falls onto a second particular pixel for detecting the second color in the second position.

10. The system of claim 6, wherein generating a composite image based on the first image, the second image, the third image, and the fourth image comprises:

generating the composite image to include a first pixel from the particular pixel for detecting the first color while the image sensor was in the first position and a second pixel, at a different location in the composite image than the first pixel, from the particular pixel for detecting the first color while the image sensor was in the second position.

11. A non-transitory computer-readable medium storing instructions executable by one or more computers which, upon such execution, cause the one or more computers to perform operations comprising:

obtaining, by an image sensor that includes a pattern of pixels for detecting a first color and pixels for detecting a second color, a first image of a scene while the image sensor is in a first position, where the first color and second color are different colors, where the pattern includes a four by four grid of pixels that includes two different two by two rectangle of pixels for detecting the first color, a two by two rectangle of pixels for detecting the second color, and a two by two rectangle of pixels for detecting a third color;

moving the image sensor to a second position, wherein, in the second position, a particular pixel for detecting the first color is located where a particular pixel for detecting the second color was previously located when the image sensor was in the first position;

obtaining, by the image sensor, a second image of the scene while the image sensor is in the second position;

obtaining, by the image sensor, a third image of the scene while the image sensor is in a third position, wherein, in the third position, the particular pixel for detecting the first color is located where a second particular pixel for detecting the first color was previously located when the image sensor was in the first position;

obtaining, by the image sensor, a fourth image of the scene while the image sensor is in a fourth position, wherein, in the fourth position, the particular pixel for detecting the first color is located where a particular pixel for detecting a third color was previously located when the image sensor was in the first position;

generating a composite image based on the first image, the second image, the third image, and the fourth image; and providing the composite image for output.

12. The medium of claim 11, wherein moving the image sensor to a second position comprises:

moving the image sensor to the second position such that the particular pixel for detecting the first color is located where a particular pixel for detecting the second color was previously located when the image sensor was in the first position, relative to a camera that includes the image sensor.

13. The medium of claim 11, wherein moving the image sensor to a second position comprises:

moving the image sensor to the second position such that light from the scene that fell onto the particular pixel for detecting the second color in the first position instead falls onto the particular pixel for detecting the first color in the second position.

14. The medium of claim 11, wherein moving the image sensor to a second position comprises:

moving the image sensor to the second position such that light from the scene that fell onto the particular pixel for detecting the first color in the first position instead falls onto a second particular pixel for detecting the second color in the second position.

15. The medium of claim 11, wherein generating a composite image based on the first image, the second image, the third image, and the fourth image comprises:

generating the composite image to include a first pixel from the particular pixel for detecting the first color while the image sensor was in the first position and a second pixel, at a different location in the composite image than the first pixel, from the particular pixel for detecting the first color while the image sensor was in the second position.

* * * * *